(12) United States Patent
Abel et al.

(10) Patent No.: US 6,410,850 B1
(45) Date of Patent: Jun. 25, 2002

(54) CABLE ENCLOSURE ASSEMBLY

(75) Inventors: John N. Abel, Avon; Richard Michael Flynn, Noblesville, both of IN (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/500,102

(22) Filed: Feb. 8, 2000

(51) Int. Cl.[7] .................................................. H02G 3/18
(52) U.S. Cl. .......................... 174/60; 174/66; 220/3.3; 220/241
(58) Field of Search .............................. 174/59, 60, 48, 174/64, 68.1, 135, 65 R, 66, 67; 220/3.3, 4.02, 3.8, 241, 242; 439/721, 722, 723, 724, 535

(56) References Cited

U.S. PATENT DOCUMENTS

| | | | |
|---|---|---|---|
| 5,571,023 A | * 11/1996 | Anthony | 439/142 |
| 5,676,566 A | 10/1997 | Carlson, Jr. et al. | 439/638 |
| 5,739,467 A | * 4/1998 | Fabrizi | 220/4.02 X |
| 5,763,830 A | * 6/1998 | Hsueh | 174/60 |
| 5,804,765 A | 9/1998 | Siemon et al. | 174/65 R |
| 5,807,139 A | 9/1998 | Volansky et al. | 439/638 |
| 5,925,850 A | * 7/1999 | Park | 174/60 |
| 5,942,724 A | * 8/1999 | Russo et al. | 174/48 |
| 6,005,188 A | * 12/1999 | Teichler | 174/50 |

FOREIGN PATENT DOCUMENTS

| | | | | |
|---|---|---|---|---|
| AU | 000647505 | * | 3/1994 | 174/60 |
| WO | WO 092019032 | * | 10/1992 | 174/60 |

OTHER PUBLICATIONS

A Cable Enclosure Assembly, www.siemon.com, No Date.
A Cable Enclosure Assembly, Anixter, Inc. 1997, pp. 9–26.
A Cable Enclosure Assembly, Anixter Inc., 1997, pp. 2–3.
A Cable Enclosure Assembly, www.panduit.com/products/info/minicom—fbspool.stm, No Date.
A Cable Enclosure Assembly, www.mod–tap.com, No Date.
A Cable Enclosure Assembly, Ortronics, p. 24 No Date.

* cited by examiner

Primary Examiner—Dean A. Reichard
Assistant Examiner—Dhiru R Patel
(74) Attorney, Agent, or Firm—Thomas, Kayden, Horstemeyer & Risley, LLP

(57) ABSTRACT

The cable enclosure assembly of the present invention includes a cable enclosure base, a faceplate mount, a removable full-width bezel and a cover. The cable enclosure base attaches to a wall at a location where an optical fiber cable protrudes through the wall. The cable fiber passes through a cable enclosure base cutout formed in the cable enclosure base. Next, a faceplate is attached to the faceplate mount. The faceplate mount is then attached to the cable enclosure base via a pivot-and-mount configuration. The removable full-width bezel can be connected with the cable enclosure base at two positions, thereby enabling the positioning of the bezel within the cable enclosure base to be adjusted. Lastly, the cover is removably secured to the cable enclosure base.

18 Claims, 10 Drawing Sheets

CABLE ENCLOSURE ASSEMBLY

TECHNICAL FIELD OF THE INVENTION

The present invention is generally related to cable enclosure assemblies and, more particularly, to a wall-mounted cable enclosure assembly.

BACKGROUND OF THE INVENTION

An increasing demand for higher capacity local area networks, coupled with lower costs, and availability of fiber networking cards for personal computers, has generated a need for wall-mounted housings that can accommodate multiple fiber ports and multiple copper outlets. Further, cable slack, a meter or more, must be stored in the wall-mounted housing in a configuration that maintains a minimum fiber bend radius. The wall-mounted housing should not be too large and cumbersome, but should still provide adequate protection and accessibility to the cable.

Flexible configurations are required for general-purpose wall-mounted housings because a variety of circumstances can arise in which the housings can be used. However, many housing configurations are not flexible and are unable to be adapted to specific applications because they contain one or more of the following drawbacks: density limitations (e.g., up to 6 fibers/6 copper wires); large size (height, width, and depth); lack of fiber slack storage/management; difficulty in loading fiber slack so as to maintain good fiber management; lack of space to properly manage the fiber coils in proximity to the connectors/adapters; inability to maintain minimum bend radius requirements needed to ensure cable integrity; connections that are unprotected from impact or from tampering; lack of fiber port identification areas or unsightly labeling; and high cost.

Accordingly, a need exists for a cable enclosure assembly that overcomes many of the aforementioned disadvantages and drawbacks associated with current cable enclosure assemblies.

SUMMARY OF THE INVENTION

The cable enclosure assembly of the present invention comprises a cable enclosure base, a faceplate mount, a cover and a bezel. The cable enclosure base attaches to a wall at a location where an optical fiber cable protrudes through the wall. The cable passes through a cutout formed in the cable enclosure base. Next, a faceplate is attached to the faceplate mount. The faceplate mount is then attached to the cable enclosure base. Once the faceplate mount has been attached, a bezel is attached to the cable enclosure base. The cover is then removably secured to the cable enclosure base.

In accordance with the preferred embodiment of the present invention, the bezel is a removable full-width bezel. In accordance with this embodiment, the cable enclosure base and the faceplate mount are connected together via a snap-and-pivot mounting configuration. The removable full-width bezel can be removably secured to the cable enclosure base at two locations, thereby enabling the positioning of the bezel within the cable enclosure base to be adjusted. The first location is at an inboard-position interconnect, while the second location is at an outboard-position interconnect. A slack drum that has a minimum fiber bend radius of 3/4 inch is provided in the cable enclosure base. The snap-and-pivot mounting component of the cable enclosure base is comprised of at least one pivot-point hinge and at least one snap-point latch. The snap-and-pivot-point mounting component of the faceplate mount is comprised of at least one pivot-point hook and at least one snap-point hook. When the faceplate mount is attached to the cable enclosure base, the snap-and-pivot mounting component of the cable enclosure base couples with the snap-and-pivot mounting component of the faceplate mount, thereby securing them together.

Other features and advantages of the present invention will be or become apparent to one with skill in the art upon examination of the following drawings, detailed description, and claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1A is a front view of the cover. FIG. 1B is a front perspective view of the cover. FIG. 1C is a rear perspective view of the cover.

FIG. 2A is a front view of the faceplate mount. FIG. 2B is a side view of the faceplate mount. FIG. 2C is a rear view of the faceplate mount.

FIG. 3A is a front view of the cable enclosure base. FIG. 3B is a front perspective view of the cable enclosure base.

FIG. 4A is a view of the open position of the snap-and-pivot mount. FIG. 4B is a view of the closed position of the snap-and-pivot mount.

FIG. 9A is a view of the cable enclosure base with fiber coiled around the slack drum and interfaced with a full-width modular bezel in the inboard-position interconnect. FIG. 9B is a view of the cable enclosure base with fiber coiled around the slack drum and interfaced with a full-width modular bezel in the outboard-position interconnect.

DETAILED DESCRIPTION OF THE INVENTION

The following describes the various features of the cable enclosure assembly in accordance with the preferred embodiments. However, it should be noted that many of the features (e.g., fastening devices, etc.) can be varied without deviating from the scope of the present invention.

Figure 1A:
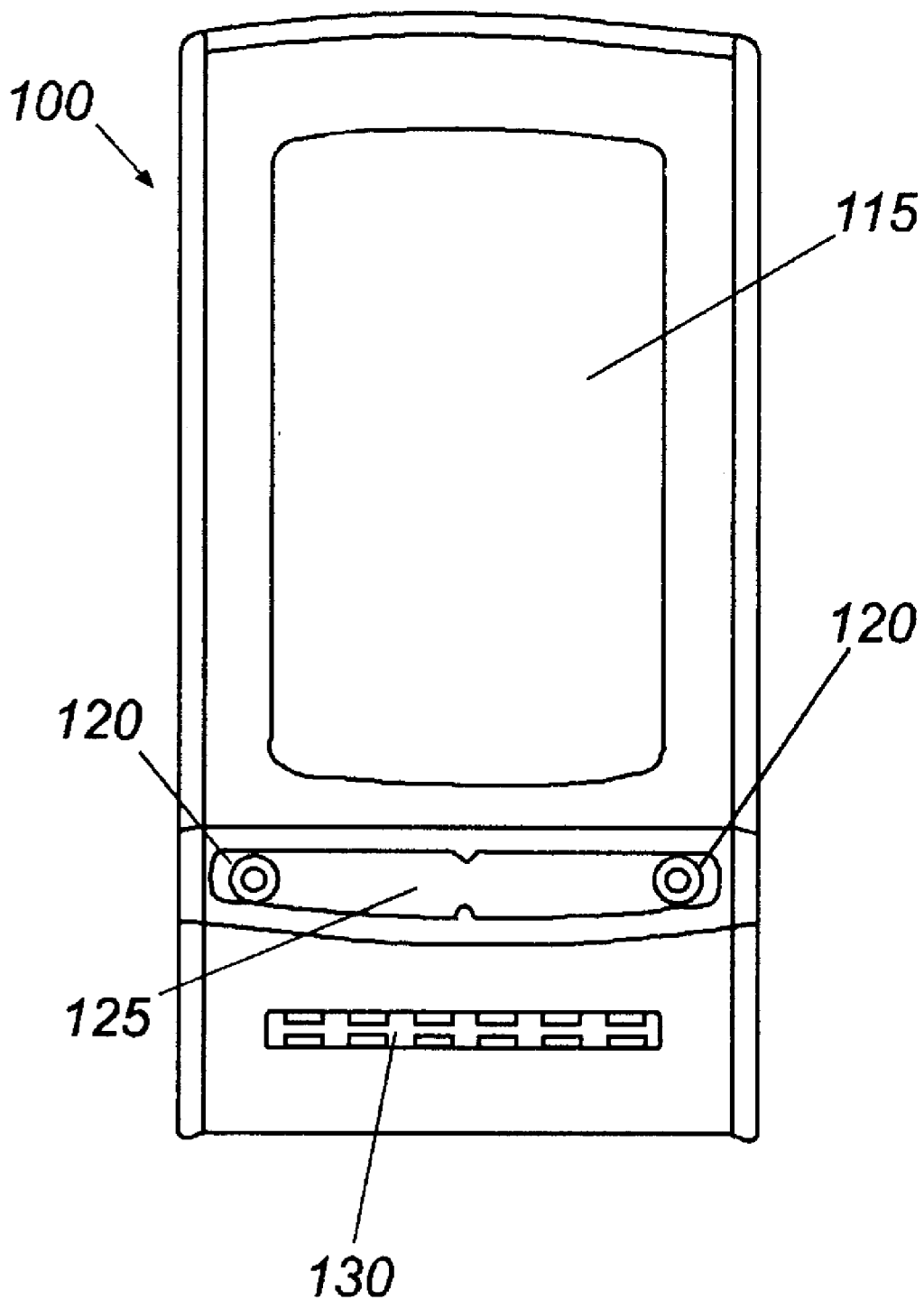
FIGS. 1A–1C provide three views of the cover of the cable enclosure assembly.
Figure 1B:
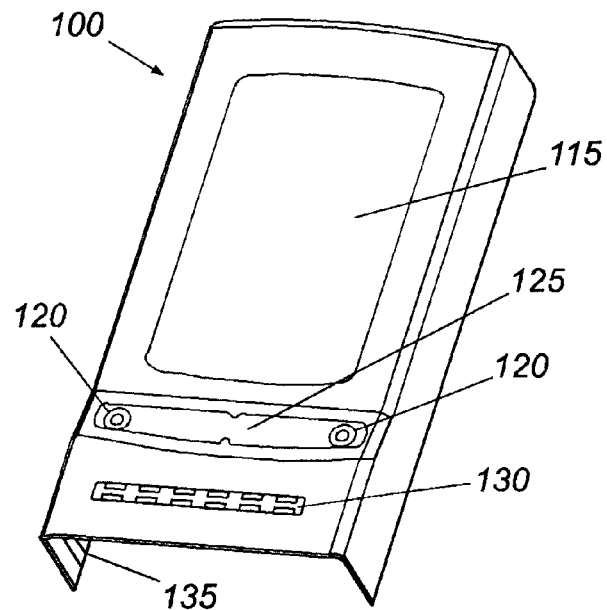
Figure 1C:
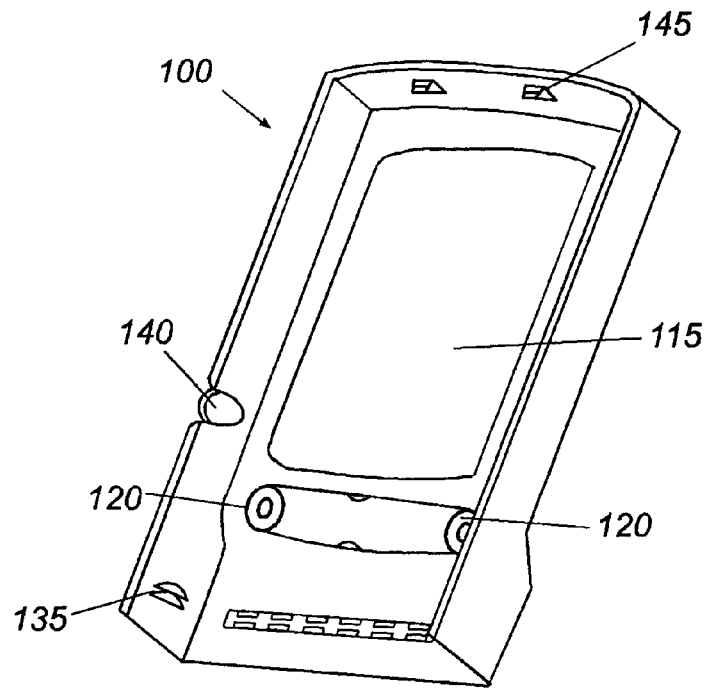

FIGS. 1A–1C provide three views of the cover 100 of the cable enclosure assembly; FIG. 1A is a front view of the cover 100, FIG. 1B is a front perspective view of the cover 100; FIG. 1C is a rear perspective view of the cover 100. FIG. 1A shows a cover cutout 115 in the cover 100 where a faceplate (not shown) and faceplate mount 200 (FIGS. 2A–2C) would be positioned. An existing, cabled, modular faceplate (not shown) can pass-through the cover 100, faceplate mount 200 (FIGS. 2A–2C), and cable enclosure base 300 (FIGS. 3A and 3B). The cover 100 has one or more holes 120 formed therein that can be used to secure the cover 100 to the cable enclosure base 300. The holes 120 preferably are placed within a label mounting recess 125. Thus, if a label (not shown) is positioned in the label mounting recess 125, the holes 120 are hidden. Plastic icons (not shown) can be positioned in the plastic icon mounting recess 130, as an additional or alternative labeling device.

As shown in FIGS. 1B and 1C, one or more nodules 135 and hooks 145 are formed in the cover 100 and are used to engage the cover 100 with the cable enclosure base 300. The label mounting recess 125 is slanted to improve viewing from above the cable enclosure assembly when it is mounted on a wall. One or more cable entry point knock-outs 140 are provided in the sides of the cover 100 to enable cables to enter from the side of the cable enclosure assembly and/or from the rear.

Figure 2C:
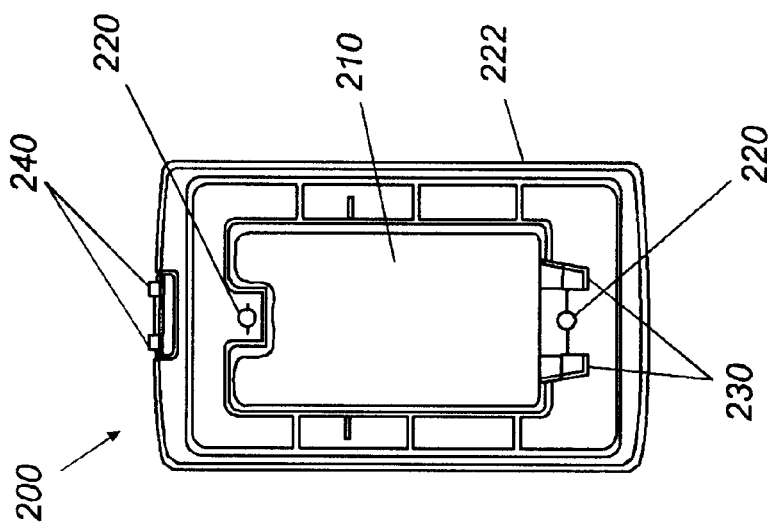
FIGS. 2A–2C provide three views of the faceplate mount of the cable enclosure assembly.
Figure 2B:
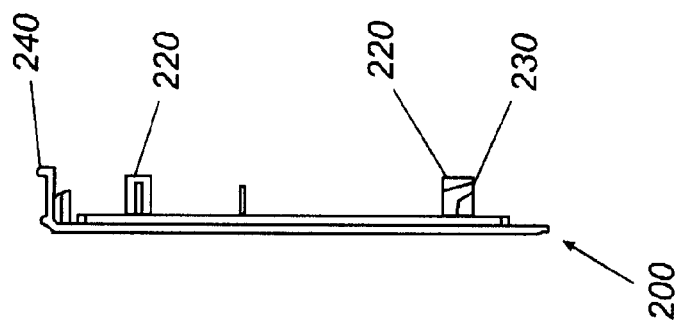
Figure 2A:
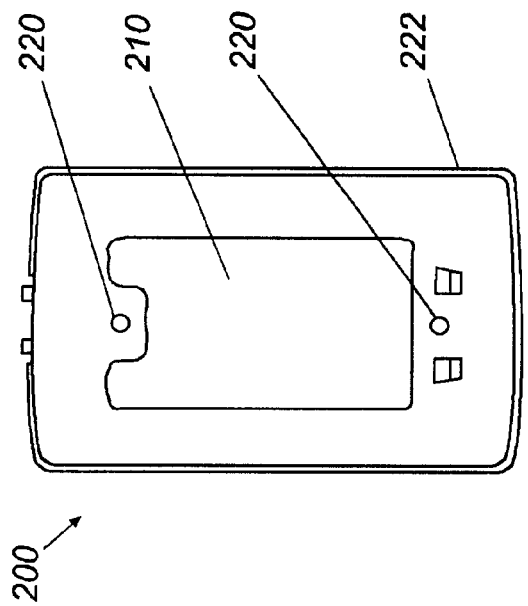
Figure 3A:
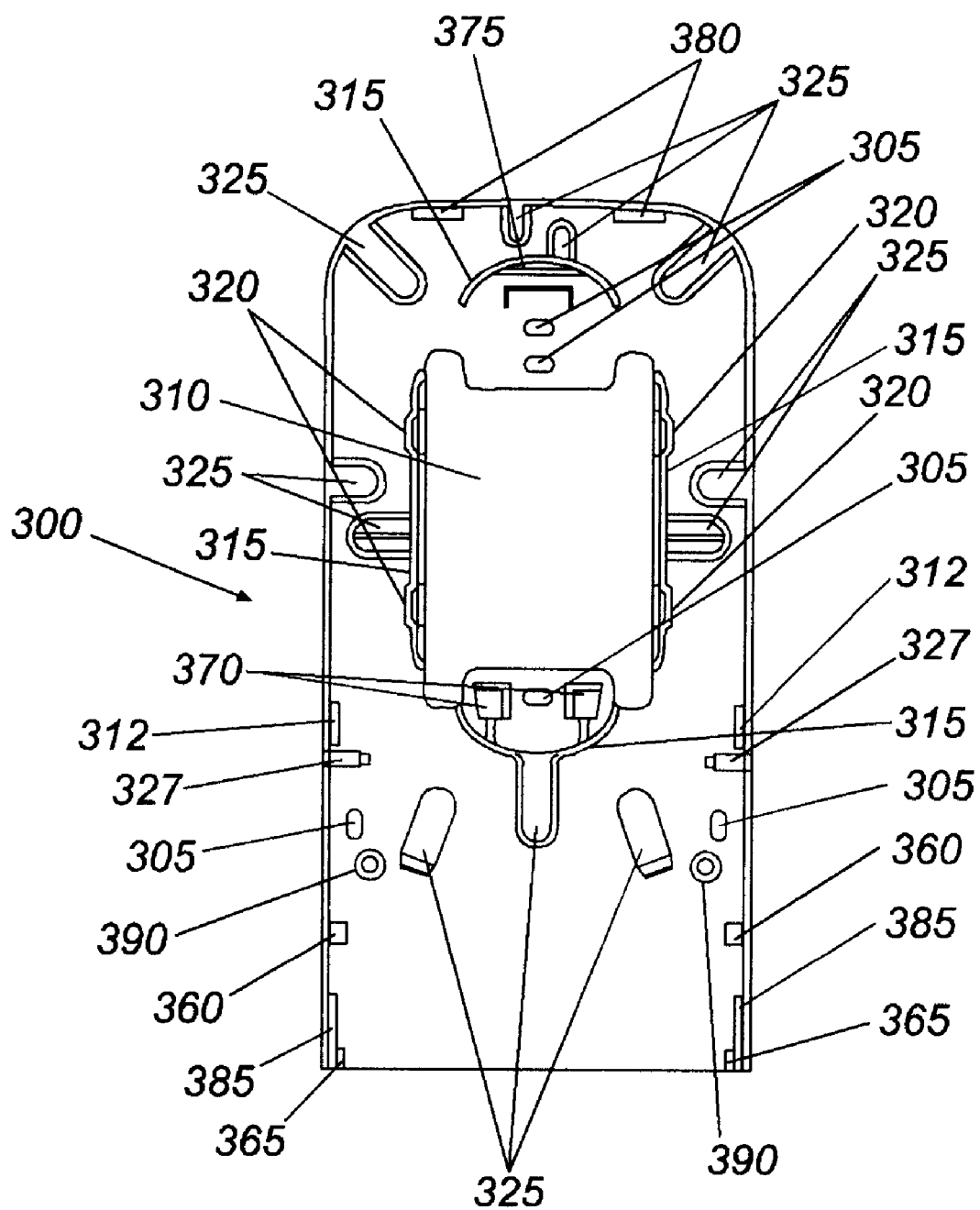
FIGS. 3A and 3B provide two views of the cable enclosure assembly base.
Figure 3B:
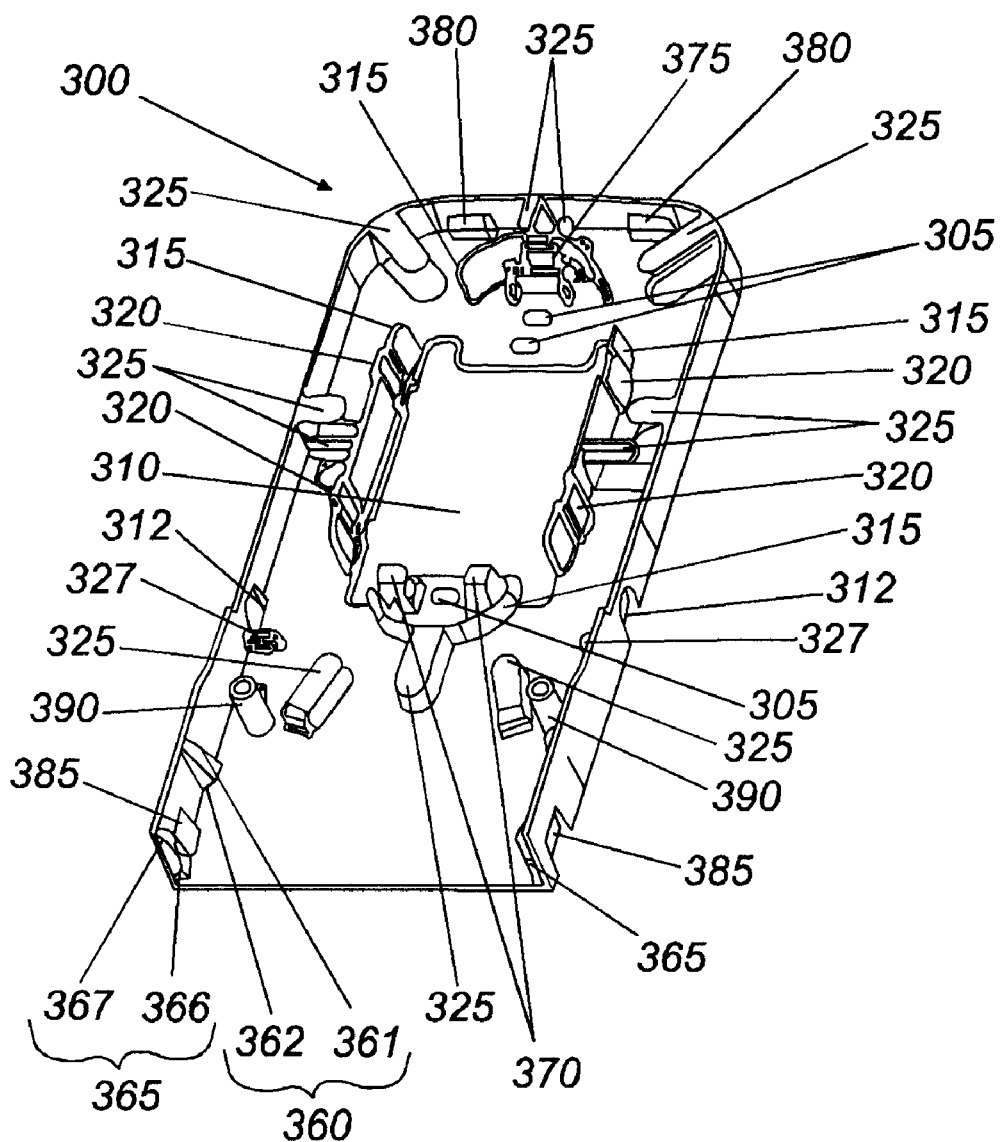

FIGS. 2A–2C provide three views of the faceplate mount 200: FIG. 2A is a front view of the faceplate mount 200; FIG. 2B is a side view of the faceplate mount 200; FIG. 2C is a rear view of the faceplate mount 200. The faceplate mount 200 has a faceplate mount cutout 210 for a faceplate (not shown). The faceplate mount 200 has one or more faceplate mount bosses 220 that can be used to secure a faceplate (not shown) to the faceplate mount 200.

With reference to FIG. 2B, one or more pivot-point hooks 230 and snap-point hooks 240 can be used to engage the faceplate mount 200 to the cable enclosure base 300. The faceplate mount flange 222 is recessed from the front of the faceplate mount 200. The faceplate mount flange 222 enables the cover 100, the faceplate mount 200, and the cable enclosure base 300 to interlock with one another, thereby providing a positive attachment action that limits shifting and movement of the cable enclosure assembly components. With reference to FIG. 2C, a faceplate mount boss 220 may be located between the pivot-point hooks 230.

FIGS. 3A and 3B provide rear and front perspective views, respectively, of the cable enclosure base 300. The cable enclosure base 300 can be mounted to a wall (not shown) via one or more mounting holes 305. A cable from the wall (not shown) can enter the cable enclosure assembly through the cable enclosure base cutout 310 and through one or more cable enclosure base side cable entry points 312. The cable enclosure base side cable entry points 312 align with the cable entry point knock-outs 140 formed in the sides of the cover 100. If the knock-outs are removed, then the cable can enter the cable enclosure assembly from the side. A cable entering from the cable enclosure base cutout 310 is secured to the cable enclosure base 300 by one or more rear cable-tie-off-points 320 located on or near the slack drum 315. If the cable enters the cable enclosure base 300 from the cable enclosure base side cable entry points 312, the cable can be secured at one or more cable enclosure base side entry cable-tie-off-points 327 proximately located next to the cable enclosure base side cable entry points 312. As will be understood by those skilled in the art, providing the ability for the cable to enter from the side and/or rear entry points provides the cable enclosure assembly with great flexibility in implementation.

The slack drum 315 preferably is a broken-oval that encircles the cable enclosure base cutout 310. The slack drum 315 preferably is made of four sections that do not form a continuous oval. An alternative number of sections can form the slack drum 315. The cable enters the cable enclosure base cutout 310 and is secured to the cable enclosure base 300 at a rear cable-tie-off-point 320 and then enters the slack drum 315 at one of the discontinuities of the oval of the slack drum 315. The fiber from the cable is wrapped around the slack drum 315 and retained by one or more fiber retaining tabs 325. Fiber retaining tabs 325 are positioned at multiple points proximately located around the slack drum 315 and limit the movement of the fiber. The curvature and dimensions of the slack drum 315 prevent the fiber from being reduced to less than a ¾ inch bend radius, even when the fiber is pulled tight. In accordance with the preferred design, a minimum of twelve meters of buffered cable can be stored within the cable enclosure assembly.

The inboard-position interconnect 360 and the outboard-position interconnect 365 preferably use a tongue-and-groove construction with a snap-fit to hold a removable full-width bezel 500/600/700/800 in the cable enclosure base 300 (FIGS. 5–8). FIGS. 5–8 illustrate five different designs of the full-width bezels that can be attached to the cable enclosure base 300. Each of these designs are discussed below in detail. The groove 362/367 is formed by two parallel flanges, each which has a clip 361/366 that fits into an indention 510/610/710/810 on the removable full-width bezel 500/600/700/800. As the full-width bezel 500/600/700/800 slides into place, the clip 361/366 snaps into the indention 510/610/710/810. When an attempt is made to remove the full-width bezel 500/600/700/800, the clip 361/366 meets the indention 510/610/710/810 edge and resists being removed. However, applying minimal force will remove or unsnap the full-width bezel 500/600/700/800 from this secure position.

The inboard-position interconnect 360 provides additional protection and tamper resistance for the fiber connections, while the outboard-position interconnect 365 allows easy access to fiber connections for simple changes or moves. This is an advantage over previous cable enclosure assemblies because a separate extended cover is not needed to provide additional protection. Here, simply moving the bezel from the outboard-position interconnect 365 to the inboard-position interconnect fulfills that need.

With reference again to FIGS. 1A–1C and 3A–3C, the cable enclosure base 300 is attached to the cover 100 at two points. One or more hooks 145 on the cover 100 attach to one or more of the slots 380 on the cable enclosure base 300. One or more nodules 135 on the cover 100 attach to one or more of the openings 385 on the cable enclosure base 300. Preferably, two sets of hooks 145 and slots 380 are used in conjunction with two sets of nodules 135 and openings 385. In addition, the faceplate mount flange 222 interlocks with the cover 100 to provide a positive attachment action of the cover 100 with the faceplate mount 200 and cable enclosure base 300. Furthermore, the cover 100 can be attached to the cable enclosure base 300 by one or more security screws that would be positioned through one or more holes 120 of the cover 100 and secured to one or more of the cable enclosure base bosses 390.

Figure 4A:
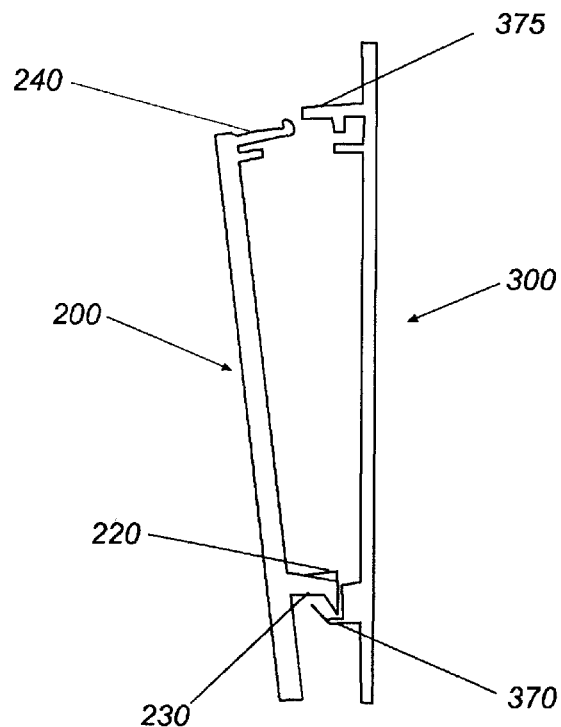
FIGS. 4A and 4B provide two views of the faceplate mount engaging with the cable enclosure base at the snap-and-pivot mount.
Figure 4B:
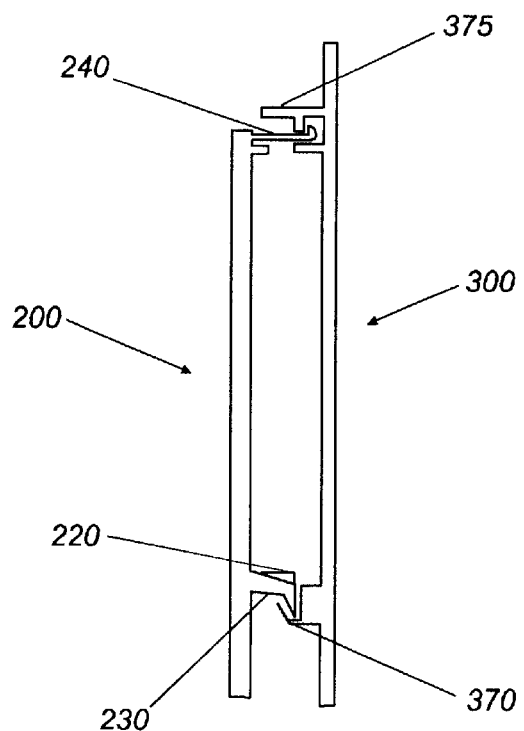

FIGS. 4A and 4B illustrate attachment of the faceplate mount 200 to the cable enclosure base 300 with the aforementioned snap-and-pivot mount configuration. Preferably, the snap-and-pivot mount is made up of four elements, which provide two securing mechanisms. The two first elements are located on the faceplate mount 200 and are the pivot-point hook 230 and the snap-point hook 240. The other two elements are located on the cable enclosure base 300 and include the pivot-point hinge 370 and the snap-point latch 375. The two securing mechanisms of the snap-and-pivot mount are made when the pivot-point hook 230 and the snap-point hook 240 are engaged with the pivot-point hinge 370 and snap-point latch 375, respectively. One or more elements on the cable enclosure base 300 and faceplate mount 200 can be used if necessary.

FIGS. 4A and 4B show the open and closed position of the snap-and-pivot mount, respectively. The open position shown in FIG. 4A occurs when the pivot-point hinge 370 is engaged with the pivot-point hook 230. In the open position, the faceplate mount 200 is at an oblique angle relative to the cable enclosure base 300. The closed position shown in FIG. 4B occurs when the faceplate mount 200 is pivoted at the pivot-point hook 230 such that the snap-point hook 240 engages with the snap-point latch 375. In the closed position, the pivot-point hook 230 and the snap-point hook 240 are engaged with the pivot-point hinge 370 and snap-point latch 375, respectively. The snap-and-pivot mount permits toolless, independent access to either the copper or fiber terminations. The snap may be released with the use of a fingertip or a screwdriver. After the snap has been released, the faceplate mount 200 can be pivoted back at the pivot point to gain access to the cable.

Figure 5:
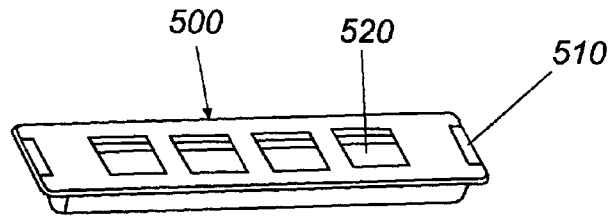
FIG. 5 is a perspective view of a LC full-width bezel.
Figure 9A:
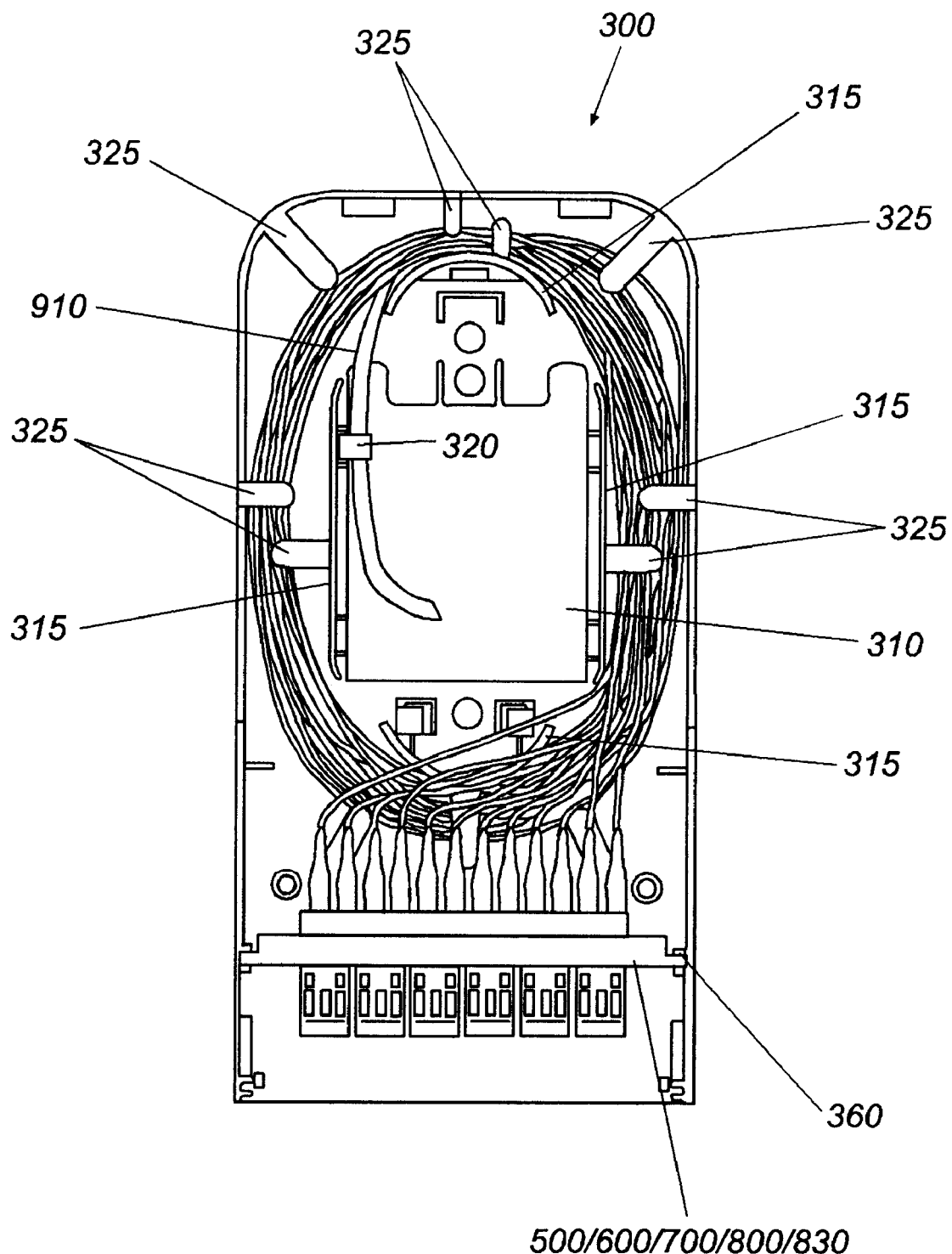
FIGS. 9A and 9B provide two views of the cable enclosure base.
Figure 9B:
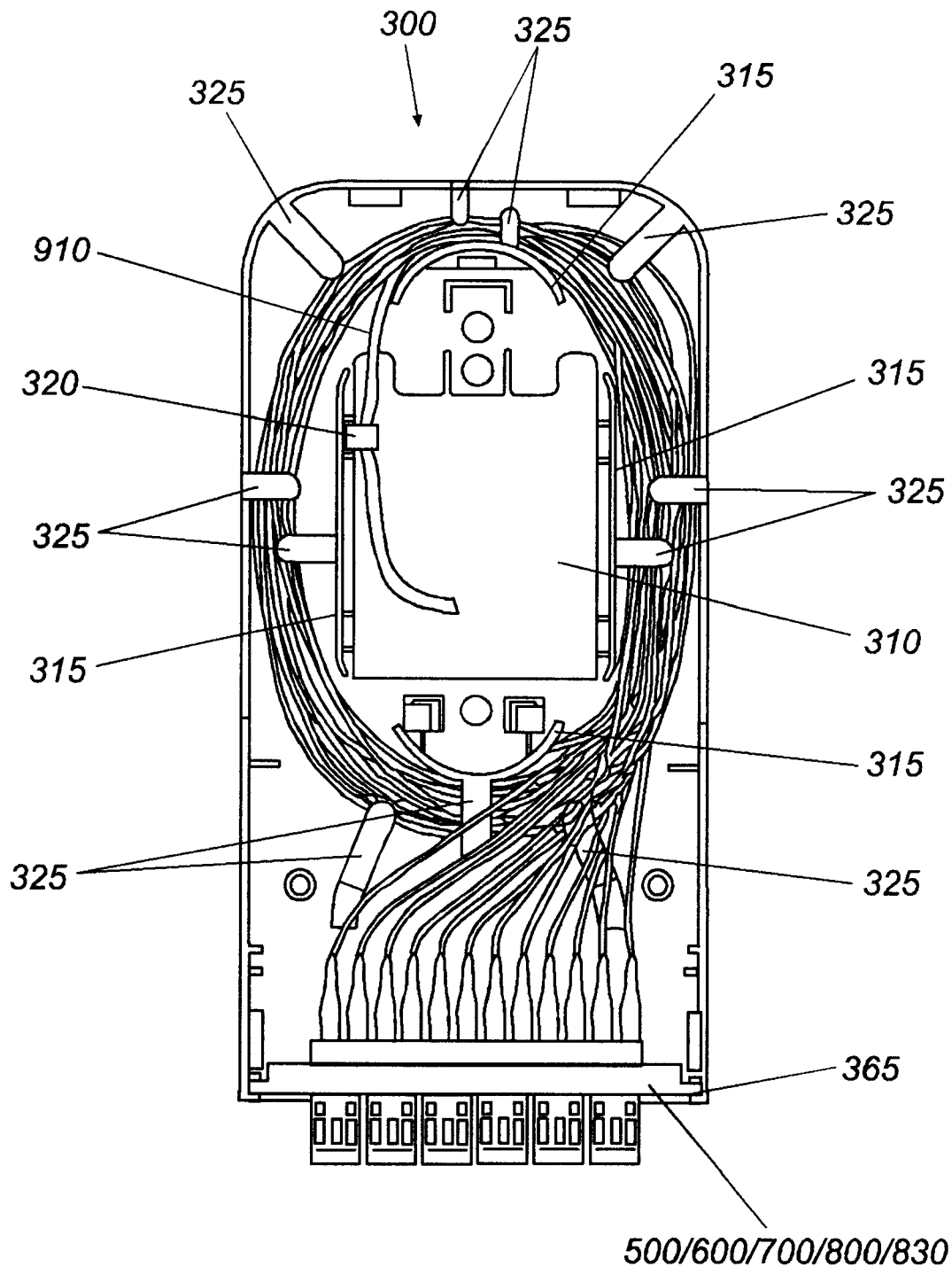

FIG. 5 is a perspective view of a LC full-width bezel 500. In the following discussion, reference is made to several different types of optical connectors, each bearing its own unique letter designations commonly used by those skilled in the art and which has become standard nomenclature in the art. As a general rule, these letters describe one or more characteristics of the connector, thus, "SC" indicates "subscriber channel," "ST" indicates "straight tip" ferrule, "SC/ST" is a hybrid connector, "LC" indicates a "Lambert connector" or "Lucent connector." These designations are well known and in common usage. The LC full-width bezel 500 has four LC duplex cutouts 520 for LC duplex couplers. The LC full-width bezel 500 fits into the groove 362/367 of the inboard-position interconnect 360 or the outboard-position interconnect 365. As the LC full-width bezel 500 slides into place, it becomes secured by a clip 361/366 that fits into the indention 510 on the LC full-width bezel 500. For easier access to the fiber connection, the LC full-width bezel 500 can be positioned in the outboard-position interconnect 365 as generally shown in FIG. 9B. If more protection is needed or desired, then the LC full-width bezel 500 can be positioned in the inboard-position interconnect 360, as generally shown in FIG. 9A. The LC full-width bezel 500 may be inserted into either groove 362/367, thereby simplifying assembly.

Figure 6:
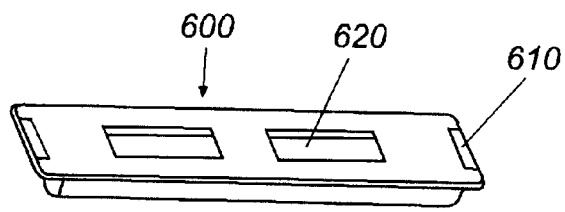
FIG. 6 is a perspective view of a SC full-width bezel.

FIG. 6 is a perspective view of a SC full-width bezel 600. The SC full-width bezel 600 has two SC duplex cutouts 620 for SC duplex couplers. The SC full-width bezel 600 fits into the groove 362/367 of the inboard-position interconnect 360 or the outboard-position interconnect 365. As the SC full-width bezel 600 slides into place, it becomes secured by a clip 361/366 that fits into the indention 610 on the SC full-width bezel 600. For easier access to the fiber connection, the SC full-width bezel 600 can be positioned in the outboard-position interconnect 365, as generally shown in FIG. 9B. If more protection is needed or desired, then the SC full-width bezel 600 can be positioned in the inboard-position interconnect 360, as generally shown in FIG. 9A. The SC full-width bezel 600 may be inserted into either groove 362/367, thereby simplifying assembly.

Figure 7:
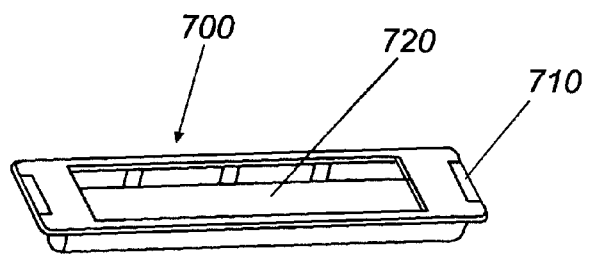
FIG. 7 is a perspective view of a modular full-width bezel.

FIG. 7 is a perspective view of a modular full-width bezel 700. The modular full-width bezel 700 can accommodate high density ST, SC, and LC coupling strips forms. The modular full-width bezel 700 fits into the groove 362/367 of the inboard-position interconnect 360 or the outboard-position interconnect 365. As the modular full-width bezel 700 slides into place, it becomes secured by a clip 361/366 that fits into the indention 710 on the modular full-width bezel 700. For easier access to the fiber connection, the modular full-width bezel 700 can be positioned in the outboard-position interconnect 365, as generally shown in FIG. 9B. If more protection is needed or desired, then the modular full-width bezel 700 can be positioned in the inboard position interconnect 360, as generally shown in FIG. 9A. The modular full-width bezel 700 may be inserted into either groove 362/367, thereby simplifying assembly.

Figure 8:
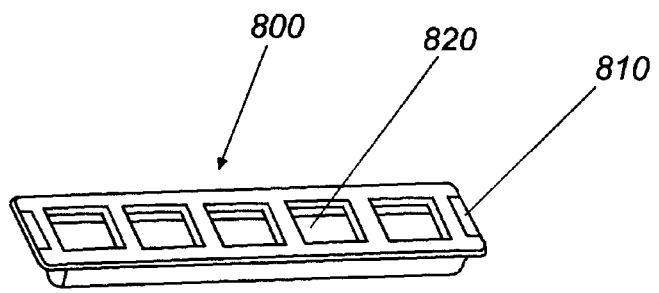
FIG. 8 is perspective view of a telephone-type modular full-width bezel.

FIG. 8 is a perspective view of a telephone-type modular full-width bezel 800. The telephone-type modular bezel 800 has five copper duplex cutouts 820 for copper telephone-type modular jacks, or "M" series modular adapters. The five cutouts 820 have a larger dimension than the LC duplex cutouts 520 enabling the telephone-type modular bezel 800 to accept the modular jacks or adapters. The telephone-type modular bezel 800 fits into the groove 362/367 of the inboard-position interconnect 360 or the outboard-position interconnect 365. As the telephone-type modular bezel 800 slides into place, it becomes secured by a clip 361/366 that fits into the indention 810 on the telephone-type modular bezel 800. For easier access to the fiber connection, the telephone-type modular bezel 800 can be positioned in the outboard-position interconnect 365, as generally shown in FIG. 9B. If more protection is needed or desired, then the telephone-type modular bezel 800 can be positioned in the inboard position interconnect 360, as generally shown in FIG. 9A. The telephone-type modular bezel 800 may be inserted into either groove 362/367, thereby simplifying assembly.

Additionally, the telephone-type modular bezel 800 accepts an "M" series adapter (not shown) that can snap-fit into the cutouts 820. The "M" series adapter is available for ST simplex, F-81 coax cable, BNC coax cable, and LC duplex couplers. This adds additional flexibility when compared to other cable enclosure assemblies.

The full-width bezels 500/600/700/800 enable the cable enclosure assembly of the present invention to be quite flexible with up to twelve fiber ports and six modular copper outlets or up to eleven modular copper outlets. It is compatible with single gang modular faceplates with one, two, three, four or six ports. It supports ST, SC, and LC fiber connectors. The full-width bezels can accommodate ST/SC hybrid, SC/SC duplex, LC duplex, or high density ST, SC, LC coupling strips and telephone-type modular connectors. An advantage of using the modular full-width bezel 700 with the high density coupling strips is that it less expensive to manufacture high density coupling strips than to manufacture duplex couplers of equivalent connection density. Furthermore, the high density coupling strips provides more connections in a narrower space when compared to other cable enclosure assemblies. Additionally, a modular copper full-width bezel can be used to add five modular copper outlets to the six modular copper outlets located on the gang modular faceplate. Also, using the telephone-type modular bezel 800 with an "M" series adapter allows even greater flexibility. ST simplex, F-81 coax cable, BNC coax cable, and LC duplex adapters can be inserted into the modular copper full-width bezel so that those types of connections can be made.

Numerous configurations can be made by using the telephone-type modular bezel 800 with any combination of "M" series adapters. For example, up to six modular copper outlets can be used on the faceplate while up to five BNC coax cable connections can be made using the telephone-type modular bezel 800 with five BNC coax cable "M"

series adapters. Alternatively, two BNC coax cable and two F-81 coax cable connections can be used in conjunction with up to six modular copper outlets. Thus, this flexibility allows this invention to be used for many diverse applications.

FIGS. 9A–9B provide two views of the cable enclosure base 300 with a fiber cable 910 secured thereto. FIG. 9A is a view of the cable enclosure base 300 with a fiber cable 910 secured to the cable enclosure base 300 at a rear cable-tie-off-point 320. The fiber of the fiber cable 910 is coiled around the slack drum 315 and positioned under the fiber retainer tabs 325. The fiber connectors attached to the ends of the fibers are interfaced with a full-width bezel 500/600/700/800 in the inboard-position interconnect 360 for greater protection without the need for the addition of a separate longer cover, which is typically used in other housings.

FIG. 9B is a view of the cable enclosure base 300 with a fiber cable 910 secured to the cable enclosure base at a rear cable-tie-off-point 320. The fiber of the fiber cable 910 is coiled around the slack drum 315 and positioned under the fiber retainer tabs 325. The fiber connectors attached to the ends of the fibers are interfaced with a full-width bezel 500/600/700/800 in the outboard-position interconnect 365 for ease of accessibility. The dual-position interconnect feature provides two positions for the full-width bezel 500/600/700/800. This is advantageous because no separate parts are necessary.

Figure 10:
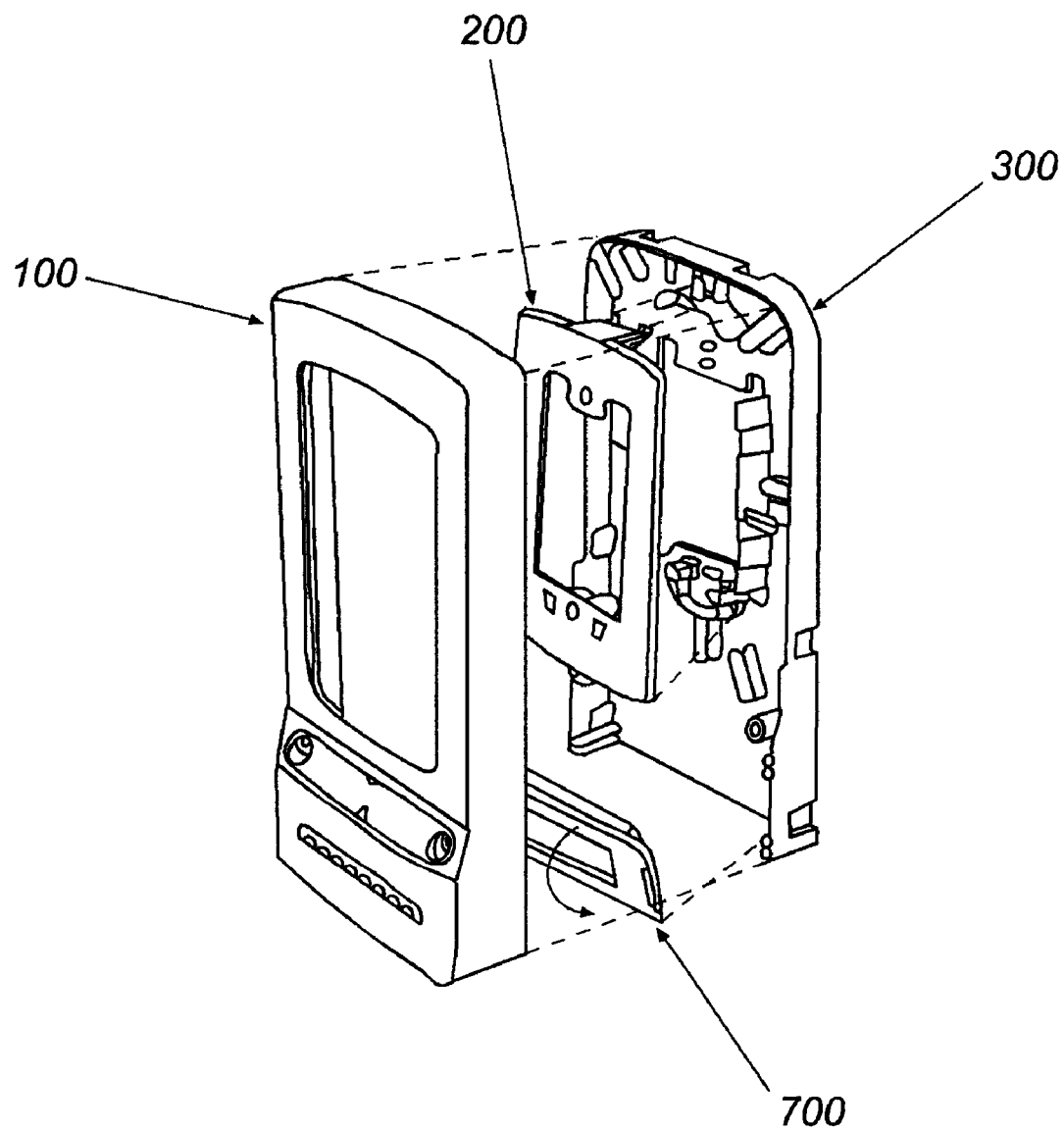
FIG. 10 is a front perspective view of the cover, faceplate mount, removable full-width bezel, and cable enclosure base simulating how each would fit relative to one another.

FIG. 10 is a perspective view of the cover 100, faceplate mount 200, modular full-width bezel 700, and the cable enclosure base 300. This perspective shows how the four parts fit together. First, the cable enclosure base 300 is attached to a wall with the fiber cables properly protruding through the cable enclosure base cutout 310. The fiber cables 910 (not shown) are then properly terminated and plugged into the fiber couplers, which are snapped into a modular full-width bezel 700. However, any one of the full-width bezels 500/600/700/800 can be used. Second, the modular full-width bezel 700 is placed in the inboard-position interconnect 360 or the outboard-position interconnect 365. Third, the copper cordage is stripped and terminated in the conventional manner, attached to the faceplate, and the faceplate is positioned in the cutout 115 of the faceplate mount 200. Fourth, the faceplate mount 200 is attached to the cable enclosure base using the aforementioned snap-and-pivot mounting configuration. Once this is complete, the faceplate is attached to the faceplate mount 200. Finally, the cover 100 is attached to the cable enclosure base 300 using the hooks 145 and nodules 135 on the cover 100, as described above.

The cover 100, faceplate mount 200, and cable enclosure base 300 interlock with one another, thereby providing a positive attachment action that limits shifting and movement of the cable enclosure assembly components. If further securing in needed, securing screws (or other securing mechanism) can be used to attach the cover 100 to the cable enclosure base 300 via the holes 120 in the cover 100. The screw will go through the hole 120 and into the cable enclosure base boss 390. The unit mounts to standard wall outlet boxes, MUD frames, or may be surface mounted.

It should be noted that the above-described embodiments of the present invention are merely examples of preferred implementations, and are used to set forth for a clear understanding of the principles and concepts of the invention. Many variations and modifications may be made to the above-described embodiment(s) of the invention without departing from the scope of the invention. All such modifications and variations are intended to be included within the scope of the present invention and covered by the following claims.

What is claimed is:

1. A cable enclosure assembly comprising:
    a cable enclosure base, wherein said cable enclosure base comprises:
        a snap-and-pivot mounting device, and
        an interconnect for engaging a removable full-width bezel;
    a faceplate mount, wherein said faceplate mount comprises:
        a snap-and-pivot mounting device, the snap-and-pivot mounting device of the cable enclosure base engaging the snap-and-pivot mounting device of the faceplate mount when the faceplate mount is engaged with the cable enclosure base;
    a removable full-width bezel engaged with the interconnect; and
    a cover that engages said cable enclosure base.

2. The cable enclosure assembly of claim 1, wherein the interconnect is an inboard-postion interconnect.

3. The cable enclosure assembly of claim 1, wherein the interconnect is an outboard-position interconnect.

4. The cable enclosure assembly of claim 1, wherein said removable full-width bezel is selected from the group consisting of dual-duplex subscriber channel (SC), dual-duplex subscriber channel (SC)/straight tip (ST), quad Lambert connector (LC) duplex, high density straight tip (ST), high density subscriber channel (SC), high density Lambert connector (LC) coupling strip forms and telephone-type modular forms.

5. The cable enclosure assembly of claim 1, wherein said removable full-width bezel comprises a removable telephone-type modular full-width bezel.

6. The cable enclosure assembly of claim 5, wherein said removable telephone-type modular bezel engages with "modular" series adapters.

7. The cable enclosure assembly of claim 1, wherein said cable enclosure base further comprises:
    a slack drum for excess fiber; and
    a plurality of fiber retaining tabs positioned proximally around the said slack drum so as to manage one of said plurality of fiber positioned around the said slack drum, wherein said slack drum and said plurality of fiber retaining tabs are positioned such that the bend radius of one of said plurality of fiber will not be exceeded.

8. The cable enclosure assembly of claim 1, wherein said cable enclosure base further comprises:
    a rear cable entry point; and
    at least one rear cable entry point tie down.

9. The cable enclosure assembly of claim 1, wherein said cable enclosure base further comprises:
    at least one cable enclosure base side cable entry point; and
    at least one cable enclosure base side cable entry point tie down.

10. The cable enclosure assembly of claim 1, wherein said cable enclosure base further comprises at least one cable enclosure base boss, and wherein said cover comprises at least one hole that is aligned with said at least one cable enclosure base boss when said cover is engaged with said cable enclosure base.

11. The cable enclosure assembly of claim 10, wherein said cover comprises:
- a label mounting recess positioned such that when a label is placed into said label mounting recess said hole in said cover is hidden, and wherein the label mounting recess is slanted to provide viewing from above when the cable enclosure assembly is wall-mounted;
- at least one cover side cable entry point knock-out that is aligned with said at least one cable enclosure base side entry point when said cover and said cable enclosure base are engaged; and
- a plastic icon snap mounting recess.

12. The cable enclosure assembly of claim 1, wherein said cable enclosure base comprises at least one slot and wherein said cover comprises at least one hook, and wherein said at least one slot of said cable enclosure base is aligned with said at least one hook of said cover when the said cover is engaged with said cable enclosure base.

13. The cable enclosure assembly of claim 1, wherein said cable enclosure base comprises at least one opening, and wherein said cover comprises at least one nodule, wherein said at least one opening of said cable enclosure base is aligned with said at least one nodule of said cover when said cover is engaged with said cable enclosure base.

14. The cable enclosure assembly of claim 13, wherein said faceplate mount engages with said cable enclosure base an open position and at a closed position, wherein the open position occurs when at least one pivot-point hinge is engaged with at least one pivot-point hook such that said faceplate mount is at an oblique angle relative to said cable enclosure base, and wherein the closed position occurs when said faceplate mount is pivoted at said at least one pivot-point hook such that at least one snap-point hook engages with at least one snap-point hinge such that said at least one pivot-point hook and said at least one snap-point hook are engaged with at least one pivot-point hinge and said at least one snap-point latch, respectively.

15. The cable enclosure assembly of claim 1, wherein the snap-and-pivot mounting device of said cable enclosure base comprises at least one pivot-point hook and at least one snap-point hook, and wherein the snap-and-pivot mounting device of the faceplate mount comprises at least one pivot-point hinge and at least one snap-point latch.

16. The cable enclosure assembly of claim 1, wherein said faceplate mount further comprises:
- at least one cable enclosure base boss for engagement with said faceplate; and
- an opening for receiving fibers that are attached to said cable enclosure base and said faceplate.

17. A cable enclosure assembly comprising:
- a cable enclosure base, wherein said cable enclosure base comprises:
  - an inboard-position interconnect,
  - an outboard-position interconnect,
  - a slack drum that has a minimum fiber bend radius of ¾ inch,
  - at least one pivot-point hinge, and
  - at least one snap-point latch;
- a faceplate mount, wherein said faceplate mount comprises:
  - at least one pivot-point hook, and
  - at least one snap-point hook, and wherein when said cable enclosure base engages said faceplate mount, said at least one pivot-point hook and said at least one snap-point hook are engaged with said at least one pivot-point hinge and said at least one snap-point latch, respectively;
- a cover that engages with said cable enclosure base;
- a removable full-width bezel, said removable full-width bezel engaging with said cable enclosure base at said outboard-position interconnect.

18. A cable enclosure assembly comprising:
- a cable enclosure base, wherein said cable enclosure base comprises:
  - an inboard-position interconnect,
  - an outboard-position interconnect,
  - a slack drum that has a minimum fiber bend radius of ¾ inch,
  - at least one pivot-point hinge, and
  - at least one snap-point latch;
- a faceplate mount, wherein said faceplate mount comprises:
  - at least one pivot-point hook, and
  - at least one snap-point hook, and wherein when said cable enclosure base engages said faceplate mount, said at least one pivot-point hook and said at least one snap-point hook are engaged with said at least one pivot-point hinge and said at least one snap-point latch, respectively;
- a cover that engages with said cable enclosure base;
- a removable full-width bezel, said removable full-width bezel engaging with said cable enclosure base at said inboard-position interconnect.

* * * * *